(12) United States Patent
Nakahata

(10) Patent No.: US 7,629,992 B2
(45) Date of Patent: Dec. 8, 2009

(54) MULTIBEAM IMAGE FORMING APPARATUS

(75) Inventor: Hiroshi Nakahata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 11/502,559

(22) Filed: Aug. 11, 2006

(65) Prior Publication Data
US 2007/0053041 A1 Mar. 8, 2007

(30) Foreign Application Priority Data
Sep. 2, 2005 (JP) ............................ 2005-254725

(51) Int. Cl.
B41J 15/14 (2006.01)
B41J 27/00 (2006.01)

(52) U.S. Cl. ...................................... 347/243; 347/259

(58) Field of Classification Search ................. 347/228, 347/240, 251, 231, 243, 249–261; 359/204; 399/302
See application file for complete search history.

(56) References Cited

U.S. PATENT DOCUMENTS 5,883,455 A 3/1999 Fukasawa et al. ............. 310/91
6,304,360 B1 * 10/2001 Sekikawa ................... 359/204
7,072,087 B2 7/2006 Nakahata ..................... 359/204
7,295,359 B2 * 11/2007 Fujita et al. .................. 359/204
2005/0285929 A1 12/2005 Nakahata ..................... 347/238
2006/0275058 A1 * 12/2006 Omata ......................... 399/302

FOREIGN PATENT DOCUMENTS

| JP | 9-21974 | 1/1997 |
| JP | 2004-102006 | 4/2004 |
| JP | 2004-287237 | 10/2004 |

* cited by examiner

*Primary Examiner*—Hai C Pham
(74) *Attorney, Agent, or Firm*—Fitzpatrick, Cella, Harper & Scinto

(57) ABSTRACT

In a scanning optical device which deflection-scans a plurality of fluxes of light by one rotary polygon mirror to form a multi-color image by irradiating beams on a plurality of photosensitive drums, respectively, the fluxes of light being incident on the rotary polygon mirror have different angles with respect to a reference plane defined by a normal line of a reflecting surface of the rotary polygon mirror and a rotating direction of the rotary polygon mirror, and a flux of light deflection-scanned at the largest angle between the flux of light and the reference plane is irradiated on a photosensitive drum on which a color image having the highest brightness is formed. With this configuration, a scanning optical device in which a defective image caused by an optical facet angle error can be improved without improving the precision of parts and an image forming apparatus including the scanning optical device are provided.

10 Claims, 9 Drawing Sheets

SCANNING GROUP B    C          SCANNING GROUP A

MULTIBEAM IMAGE FORMING APPARATUS

BACKGROUND OF THE INVENTION

1. Field of the Invention

The present invention relates a scanning optical device used in image formation of an electrophotographic type and an image forming apparatus having the same.

2. Description of the Related Art

In an image forming apparatus of an electrophotographic type, scanning is performed by reflecting a beam from a light source by a rotating rotary polygon mirror, and the beam is irradiated on a photosensitive drum serving as an image bearing member to form an electrostatic latent image. In recent years, even in an image forming apparatus of an electrophotographic type, a color image is strongly demanded. For this reason, a plurality of photosensitive drums (in general, four photosensitive drums of yellow, magenta, cyan, and black) are arranged. Optical scanning is performed to the photosensitive drums to form toner images of different colors. The toner images are superposed on each other to obtain a color image.

In the color image forming apparatus as described above, as a scanning optical device which performs optical scanning to the plurality of photosensitive drums, as shown in FIG. 7, a scanning optical device in which a plurality of laser beams are scanned by one rotary polygon mirror may be used (since the scanning optical device in FIG. 7 is horizontally symmetrical, reference numerals in FIG. 7 on only one side are shown).

The scanning optical device shown in FIG. 7 uses a scheme in which two laser beams are incident on both the sides of a polygon mirror 28 serving as one rotary polygon mirror to expose photosensitive drums by irradiated beams E1 to E4. The optical arrangement is an oblique incident optical system and has a configuration in which a second image forming lens is arranged after laser beams are separated from each other.

In this case, in the oblique incident optical system, as shown in FIG. 8, when a plane (in FIG. 8, an X-Y plane) defined by a normal line of a reflecting plane of the polygon mirror 28 and a rotating direction of the polygon mirror 28, as shown in FIG. 9, a laser beam is incident at a predetermined angle with respect to the reference plane (The incident angle will be called an "oblique incident angle" hereinafter.). In this manner, upper and lower optical paths are separated from each other behind an outgoing laser beam from the polygon mirror 28.

The scanning optical device is shielded from the outside by a dust-tight glass 32 to protect the scanning optical device from dust, an optical box 33 in which optical elements are built in, and an upper lid 34 to which the dust-tight glass 32 is fixed and which seals the optical box.

Two laser beams emitted from the polygon mirror 28 transmits through a first imaging lens 29, and the laser beams transmitting through a photosensitive drum is reflected downward by a separation folding mirror 31c. Since laser beams are incident on the first imaging lens 29 at angles different from each other, the first imaging lens 29 is constituted by a cylinder lens. An image is formed in a sub-scanning direction by second imaging lenses 30 which are arranged for respective optical paths of the laser beams.

A laser beam E2 crosses the other laser beam and goes downward. The beam transmitted through the second imaging lens 30 arranged on the way, is reflected again by a folding mirror 31b arranged on the lower surface of the optical box, and is irradiated on the photosensitive drum through a side of the first imaging lens 29. In this case, laser beams E1 and E4 irradiated on the photosensitive drums on both end portions transmit immediately under the separation folding mirror 31c, transmits through the second imaging lens 30, and then are irradiated on the photosensitive drums by a folding mirror 31a. The separation folding mirror 31c is arranged such that vignetting of the beams of two laser beams is prevented from occurring by tolerances of parts, optical facet angle error of a polygonal motor, and the like.

The scanning optical device which employs the oblique incident optical system is an optical system which can perform deflection and scanning of a plurality of beams at once while keeping a unit compact.

However, on the other hand, in comparison with a optical system in which an oblique incident angle is 0, i.e., a beam is incident perpendicularly to a reflecting surface of the polygon mirror 28, the oblique incident optical system theoretically deteriorates in pitch unevenness (to be referred to as an "optical facet angle error" hereinafter) caused by an optical facet angle error. This is because the reflecting plane is eccentric with respect to a rotating shaft of the polygonal motor.

FIG. 9 shows a beam track near the polygon mirror in the oblique incident optical system. FIG. 9 shows a state in which a beam is incident on the polygon mirror 28 which is eccentric by d with respect to the rotating shaft at an oblique incident angle α. In general, this eccentricity is caused by two factors, i.e., a fluctuation of the polygon mirror itself and a play occurring between the rotating shaft of the motor and the polygon mirror 28 (the eccentricity with respect to the rotating shaft of the reflecting plane of the polygon mirror will be called "plane eccentricity" hereinafter).

As shown in FIG. 9, when plane eccentricity of d occurs in the polygon mirror 28 with respect to the rotating shaft, the reflecting plane shifts by d while the polygon mirror 28 rotates once. In the oblique incident optical system, a reflecting position shifts on the polygon mirror 28 by the plane eccentricity, and the beam shifts in a sub-scanning direction as indicated by a broken line. As a result, a sub-scanning shift having a frequency (rotational frequency of the polygon mirror 28) which is equal to that of an optical facet angle error) occurs. Since an optical facet angle error component caused by the plane eccentricity is deteriorated in proportion to an incident angle, the optical facet angle error component must be suppressed to a low level as much as possible.

In a conventional technique, since the oblique incident optical system is used, in order to suppress the eccentric component, a plurality of projecting portions may be formed around a rotating shaft to which the polygon mirror is attached, and the polygon mirror may be fixed by being caulked by the projecting portions. In this manner, the polygon mirror is fixed by caulking, fastening screws and holes for the screws are not necessary, and a fluctuation of weight with respect to a rotational center of the connected polygon mirror is reduced, so that eccentricity is reduced (Japanese Patent Application Laid-open No. 9-21974).

As another example, a play is set between the polygon mirror and the rotating shaft, and an amount of plane eccentricity and an amount of optical facet angle error are adjusted. Thereafter, the polygon mirror and the rotating shaft are fixed with an ultraviolet adhesive agent, so that pitch unevenness or the like is decreased (Japanese Patent Application Laid-open No. 2004-102006).

Parts such as the rotating shafts of the polygon mirror and the motor related to an amount of eccentricity are increased in precision and improved in adjusting precision to make it possible to further reduce the optical facet angle error.

On the other hand, in some scanning optical device of an oblique incident optical system, as shown in FIG. 7, deflection and scanning are not symmetrically performed to the polygon mirror 28, a polygon mirror is arranged at an end portion of the scanning optical apparatus to perform deflection and scanning of all beams on the same plane.

In particular, in Japanese Patent Application Laid-open No. 2004-287237, the following configuration is described. That is, deflection and scanning of a plurality of beams are performed on the same plane of the polygon by oblique incidence, and an incident angle of a laser to form yellow and black toner images is increased.

In contrast to this, in such a scanning optical device, oblique incident angles must be different from each other to separate beams from each other. For this reason, an optical path having an oblique incident angle larger than those of other optical paths is consequently generated.

When the oblique incident angle becomes large, even though an optical facet angle error is small, a shift of a beam caused by the optical facet angle error is larger than that obtained when the oblique incident angle is small. For this reason, when a beam having a large oblique incident angle exposes an image bearing member for forming a toner image constituted by a toner having a low brightness, a color shift is conspicuous because the toner image having the low brightness is easily conspicuous.

SUMMARY OF THE INVENTION

It is an object of the present invention to provide a scanning optical device which reduces an influence on an image caused by an optical facet angle error when a plurality of beams are obliquely incident on the same plane of a rotary polygon mirror.

An image forming apparatus of the present invention includes: a rotary polygon mirror which scans a plurality of laser beams to be incident on the same plane, wherein at least some of the plurality of laser beams are incident at different angles with respect to a plane perpendicular to a rotating shaft of the rotating polygon mirror; and an latent image bearing member on which an image is exposed by a laser beam being incident on the rotary polygon mirror at the smallest angle between a rotating shaft of the rotary polygon mirror and a plane perpendicular to the rotating shaft of the rotary polygon mirror and said latent image is developed with a toner having the lowest brightness of colors of toners to be developed by exposure by other laser beams being incident on the same plane of the rotary polygon mirror.

Still another object of the present invention will be apparent from the following explanation.

DESCRIPTION OF THE EMBODIMENTS

A scanning optical device according to an embodiment of the present invention will be described together with an image forming apparatus including the scanning optical device.

[First Embodiment]

Figure 1:
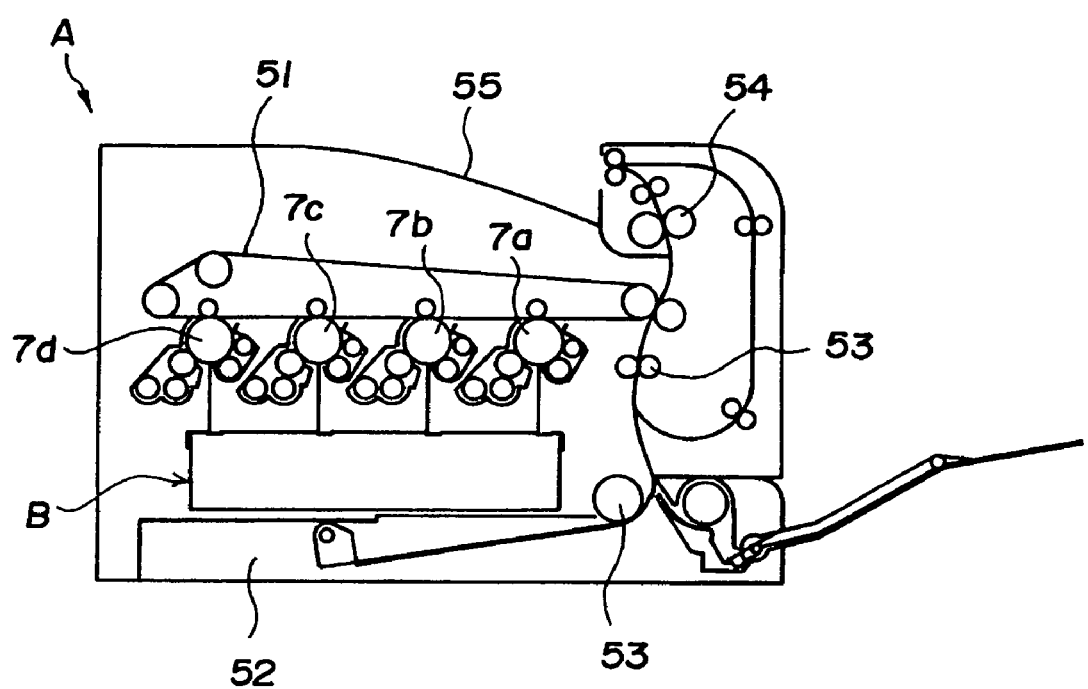
FIG. 1 is a pattern sectional diagram for explaining an entire configuration of an image forming apparatus.
Figure 2:
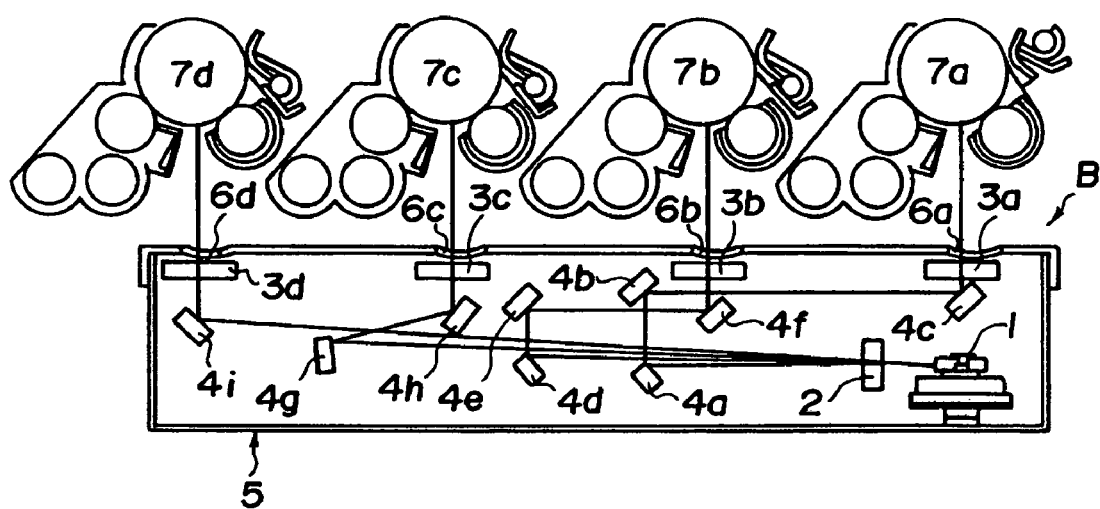
FIG. 2 is a sectional diagram for explaining a scanning optical device which irradiates beams on four photosensitive drums.
Figure 3:
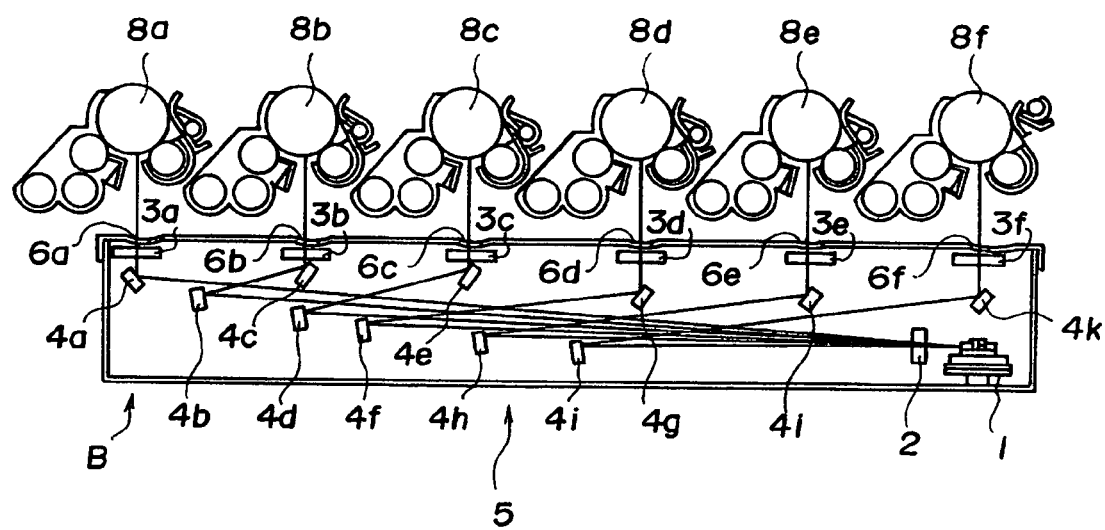
FIG. 3 is a sectional diagram for explaining a scanning optical device which irradiates beams on six photosensitive drums.
Figure 4:
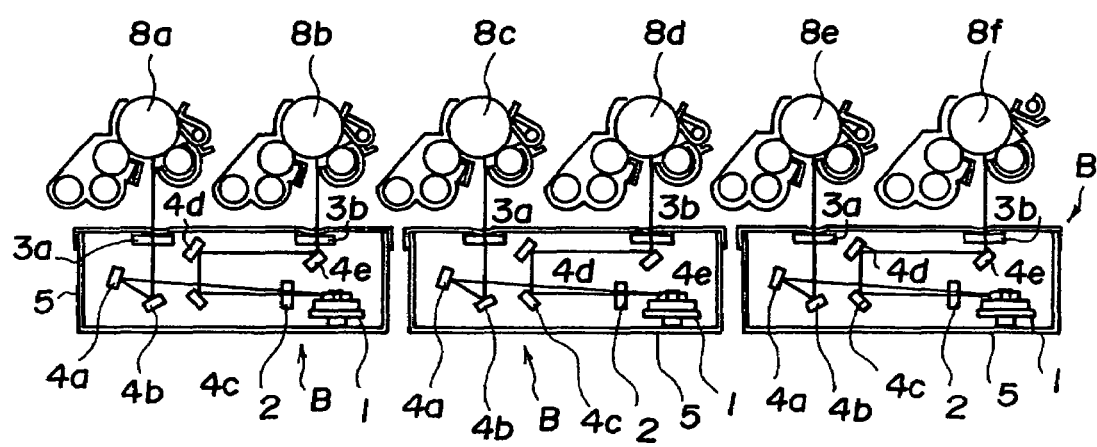
FIG. 4 is a sectional diagram for explaining scanning optical devices in which beams are irradiated on six photosensitive drums by using three scanning optical devices.
Figure 5:
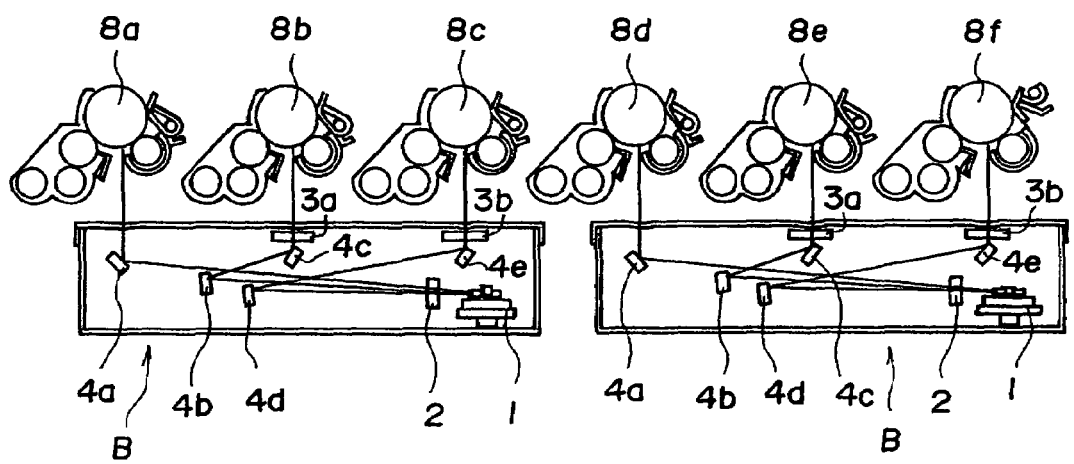
FIG. 5 is a sectional diagram for explaining scanning optical devices in which beams are irradiated on six photosensitive drums by using two scanning optical devices.

A scanning optical device and an image forming apparatus according to a first embodiment will be described below with reference to FIGS. 1 to 4. FIG. 1 is a pattern sectional diagram showing an entire configuration of the image forming apparatus, FIGS. 2 and 3 are sectional diagrams for explaining the scanning optical device, and FIGS. 4 and 5 are sectional diagrams for explaining a scanning optical device having a plurality of scanning groups.

(Entire Configuration of Image Forming Apparatus)

An entire configuration of an image forming apparatus having a scanning optical device will be described below together with an image forming operation with reference to FIG. 1. FIG. 1 shows an image forming apparatus A which prints a color image. In the image forming apparatus A, four photosensitive drums 7a to 7d serving as image bearing members independently set to colors, i.e., yellow, magenta, cyan, and black are arranged in parallel to each other. A charging means which electrically charges the photosensitive drums 7a to 7d, a developing means which develops an electrostatic latent image, and the like are arranged around the photosensitive drums 7, and a scanning optical device B (will be described later) is arranged below the photosensitive drums 7.

In image formation, the electrically charged scanning optical device B irradiates laser beams depending on images of respective colors on the corresponding photosensitive drums 7a to 7d to form electrostatic latent images, respectively. The latent images are developed with toner, superposed on an intermediate transfer belt 51, and primarily transferred to form a color image. The color image is secondarily transferred onto a recording material which is conveyed from a cassette 52 under the device main body to a secondary transfer unit by a conveyance roller 53 as a conveyance means in synchronism with the image formation. Furthermore, the recording material transferred with toner is conveyed to a fixing means 54, heated, and pressured to fix a toner image. Thereafter, the recording material is discharge to a discharge portion 55.

(Scanning Optical Device)

The scanning optical device B which irradiates a laser beam as a flux of light on the photosensitive drums 7a to 7d will be described below with reference to FIG. 2.

In FIG. 2, reference numeral 1 denotes a polygon mirror serving as a rotary polygon mirror which performs deflection and scanning of a laser beam emitted by a laser, and reference numeral 2 denotes a first imaging lens to form spot images by laser beams on the photosensitive drums 7a to 7d. Reference numerals 3a to 3d denote second imaging lenses which form spot images on the drums together with the first imaging lens. The second imaging lenses and the first imaging lens 2 are collectively called f lenses.

In the scanning optical system according to the embodiment, in order to separates the beams deflection-scanned by the polygon mirror 1 at the back, oblique incident angles of all the beams are differently set. For this reason, the first imaging lens 2 is constituted by a cylinder lens which is free from a refracting power in a sub-scanning direction.

Reference symbols 4a to 4i are folding mirrors which reflect laser beams transmitting through the first imaging lens 2 in a predetermined direction, and reference numeral 5 denotes an optical box which supports and fixes the optical elements.

In the scanning optical device B according to the embodiment, laser beams are emitted from four light sources (light-emitting means), and all the beams are deflection-scanned by the polygon mirror 1 arranged at the end portion in the direction of the left side in FIG. 2. At this time, all the beams are deflection-scanned by the same reflecting plane of the polygon mirror 1. In the scanning optical device B, the folding mirrors 4a to 4i are arranged on the ways of optical paths to guide the laser beams deflection-scanned by the polygon mirror 1 to the predetermined photosensitive drums 7a to 7d.

The beams are deflection-scanned by the polygon mirror 1 and then transmit through the first imaging lens 2 serving as a common lens. Thereafter, the beams are reflected by the folding mirrors 4a to 4d arranged on the ways of the optical paths. The reflected beams transmit through the second imaging lens 3a to 3d arranged near the upper lid of the optical box 5 and dust-tight glasses 6a to 6d attached to the upper lid. The laser beams are irradiated on the photosensitive drums 7a to 7d, respectively. In the embodiment, the configuration has optical parts such as the first imaging lenses, the folding mirrors, and the second imaging lens.

The scanning optical device B is an optical system in which an oblique incident angle of the optical path to expose the photosensitive drum 7d in FIG. 2 is maximum. For this reason, theoretically, an optical facet angle error on the photosensitive drum 7d is worst in comparison with the optical facet angle errors of the other photosensitive drums 7a to 7c. The oblique incident angle is an angle between the rotating shaft of the rotary polygon mirror and a plane perpendicular to the rotating shaft (a rotating axis).

In the embodiment, theoretically, of colors used when the image forming apparatus records an image on the photosensitive drum 7d having the worst optical facet angle error, a color having the highest brightness is arranged. For example, in the image forming apparatus A according to the embodiment in which image formation is performed by using toners of four colors, i.e., yellow, magenta, cyan, and black, yellow is arranged on the photosensitive drums 7a to 7d.

In general, the brightness of yellow, magenta, cyan, and black decrease in the order named. Visual sensitivities to images increase in inverse proportion to the brightness. More specifically, when an optical facet angle error is constant, even an image which can be visually recognized in black cannot be visually recognized in yellow. Furthermore, the other colors, i.e., magenta and cyan have intermediate levels.

For this reason, in the scanning optical device shown in FIG. 2, black, cyan, magenta, and yellow are sequentially arranged on the photosensitive drum 7a, the photosensitive drum 7b, the photosensitive drum 7c, and the photosensitive drum 7d aligned from the polygon mirror 1 side. With this arrangement, a combination having the image levels optimum in amounts of optical facet angle error is achieved. More specifically, a laser beam which is deflection-scanned at a large angle between the laser beam and a reference plane is designed to be irradiated on a photosensitive drum which forms an image in a color having a brightness higher than that of a laser beam deflection-scanned at a small angle between the laser beam and the reference plane.

A laser beam having the lowest oblique incident angle is designed to be irradiated on black (having the lowest brightness) having the highest visual sensitivity. In this manner, an influence on a black image by an optical facet angle error is made smaller than that on images of the other colors.

Since magenta and cyan have brightness almost equal to each other, even though the positions of the colors are changed, an influence on performance is small. For this reason, sufficiently preferable images can be obtained.

FIG. 3 shows an image forming apparatus having six photosensitive drums 8a to 8f. As shown in FIG. 3, when the number of photosensitive drums increases, an optical path having an oblique incident angle which is larger than that obtained when four photosensitive drums are used is generated. For this reason, the scanning optical device B having the configuration according to the embodiment is further effective.

In the image forming apparatus in FIG. 3, in addition to the four colors, i.e., yellow, magenta, cyan, and black, two colors, i.e., light cyan and light magenta having almost equal hues and different brightness are used (colors having almost equal hues will be called colors in the same series hereinafter).

In this case, the scanning optical device B also has the same configuration as that in the case explained with reference to FIG. 2. An optical path having a large oblique incident angle is arranged on a color having a high brightness to make it possible to increase an image level in amount of optical facet angle error.

For example, toward the photosensitive drums 8a to 8f, yellow (8a), light magenta (8b), light cyan (8c), magenta (8d), cyan (8e), and black (8f) may be arranged in descending order of brightness. In addition, in this case, since colors in the same series have almost equal brightness, even though the order of the colors is changed, an influence on performance is small, and a sufficient preferable image can be obtained.

(Brightness Measuring Method)

A method of measuring a brightness L* in a powder state of toner will be described below.

The brightness L* in toner in a powder state is measured by using a spectroscopic color-difference meter "SE-2000" (manufactured by Nippon Denshoku Industries Co., Ltd.) conforming to JIS Z-8722 and a C-light-source double view as a light source. The measurement is performed according to an accompanying instruction manual. However, standard adjustment by a standard edition is preferably performed through a glass having a thickness of 2 mm and a diameter of 30 mm in an optional powder measuring cell. More specifically, the measurement is performed in a state in which a cell in which sample powder (toner) are filled is set on a powder sample table (attachment) of the spectroscopic color-difference meter. Before a cell is set on the powder sample table, a powder sample having a volume which is 80% or more of the capacity in the cell is filled in the cell, vibration is given to the powder sample once a second for 30 seconds on a vibrating table, and the brightness L* is measured.

The number of photosensitive drums is not limited to four or six. Even though the number is arbitrarily set, the same operation as described above is performed.

When the scanning optical device has the above configuration, even though a plurality of beams are obliquely incident on the same plane of the rotary polygon mirror, an influence on an image by an optical facet angle error can be reduced.

[Second Embodiment]

A device according to a second embodiment will be described below with reference to FIGS. 4 and 5. Since the basic configuration of the device according to this embodiment is the same as that of the embodiment described above, a repetitive explanation is omitted. A configuration which is a characteristic feature of the embodiment will be described below.

A scanning optical device B using an image forming apparatus may expose a plurality of photosensitive drums by using an oblique incident optical system. In particular, all the photosensitive drums need not be exposed by one polygon mirror.

In FIG. 4, in an image forming apparatus in which six photosensitive drums 8*a* to 8*f* are arranged, two adjacent photosensitive drums are exposed by one scanning optical device B, and the six photosensitive drums 8*a* to 8*f* are exposed by three scanning optical devices B. In FIG. 5, three adjacent photosensitive drums are exposed by one scanning optical device B, and six photosensitive drums 8*a* to 8*f* are exposed by two scanning optical devices B.

Each scanning optical device employs an oblique optical system as in the first embodiment described above. In optical paths, an optical path having a large oblique incident angle is arranged as an optical path which exposes a color having a high brightness.

In the configuration shown in FIG. 4, colors of the same series are deflection-scanned by the same scanning optical device B. For example, cyan and light cyan are deflection-scanned by the same scanning optical device B, and magenta and light magenta are deflection-scanned by the same scanning optical device B. At this time, an optical path having a small oblique incident angle is arranged as an optical path for a laser beam which exposes cyan having the same hue as that of light cyan and a brightness lower than that of light cyan. Similarly, it is desired that an optical path having a small oblique incident angle is arranged as an optical path for a laser beam which exposes magenta having the same hue as that of light magenta and a brightness lower than that of light magenta.

In the same scanning group, write positions in a main scanning direction can be uniformed. As a result, an image forming operation can be stabilized with a small amount of color shift between colors of the same series.

When an image in an almost solid color is formed by the image forming apparatus using screen processing, in order to make a boundary between the image and white of a recording material inconspicuous, a color of the same series is thinly recorded between lines on the screen or on a boundary portion to make the image smooth. For this reason, color shift occurs in a beam which exposes a color of the same series, a line width of the color seems to be increased in the part. As a result, roughness disadvantageously increases.

In contrast to this, as described above, according to the configuration of the embodiment, an image forming operation can be stabilized with a small amount of color shift between colors of the same series, and an image level in an amount of optical facet angle error can be optimized. For this reason, image performance can be kept preferable.

[Third Embodiment]

A device according to a third embodiment will be described below with reference to FIG. 6. Since the basic configuration of the device according to the embodiment is the same as that of the embodiment described above, a repetitive explanation is not described. A configuration which is a characteristic feature of the embodiment will be described below.

In a scanning optical device C used in the embodiment, the following system is used. That is, three laser beams are incident on both sides of one polygon mirror 10 to expose six photosensitive drums 9*a* to 9*f*. Optical paths to the photosensitive drums 9*a* to 9*f* of the scanning optical device C are horizontally symmetrical about the polygon mirror 10. For this reason, although an image scanning group A on the right in FIG. 6 will be described with reference to FIG. 6, an image scanning group B on the left side has the same configuration as that of the image scanning group A.

Laser beams are irradiated from a laser unit (not shown) and reflected by the polygon mirror 10 arranged at a center of the device to perform deflection and scanning on the photosensitive drums. The laser beams reflected by the polygon mirror 10 transmit through a first imaging lens 11 and separated and reflected by folding mirrors 12*a* to 12*e* arranged on the respective optical paths. And the laser beams pass through second imaging lens 13*a* to 13*c*, dust-tight glasses 14*a* to 14*c* and are irradiated on the respective photosensitive drums.

Figure 6:
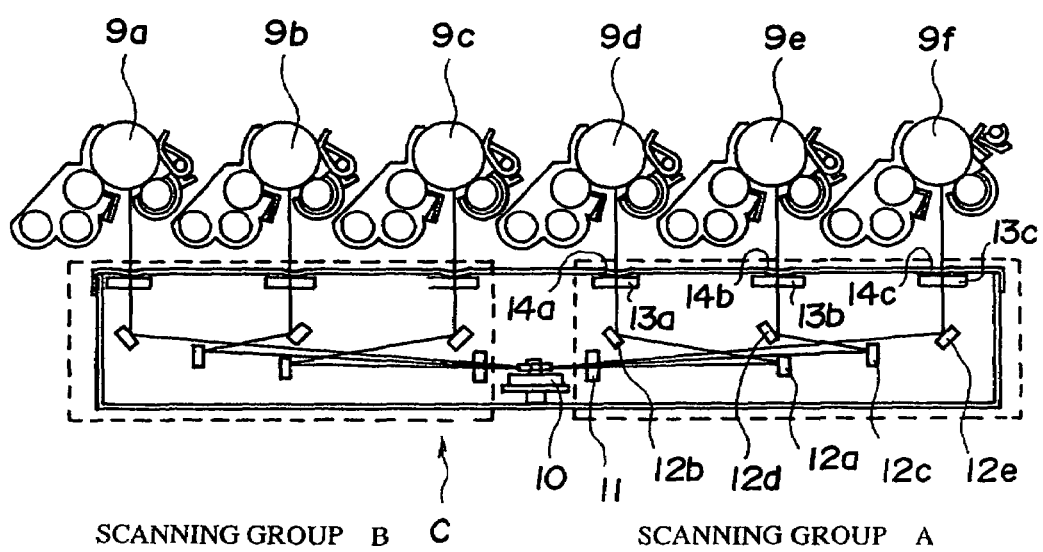
FIG. 6 is a sectional diagram for explaining a scanning optical device in which beams are irradiated on six photosensitive drums by a scanning optical device having two scanning groups.
Figure 7:
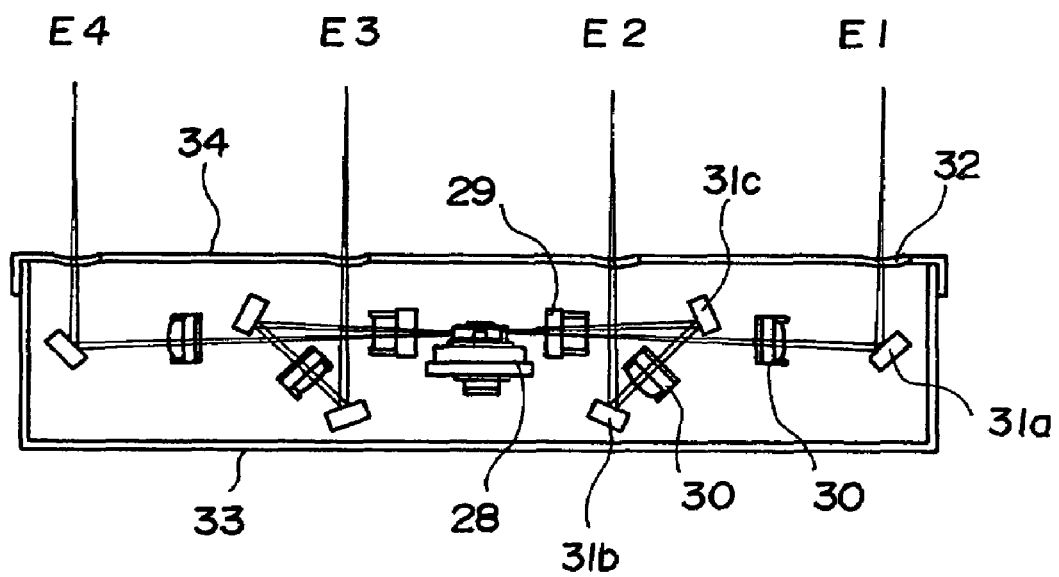
FIG. 7 is a sectional diagram for explaining a scanning optical device according to a conventional technique.
Figure 8:
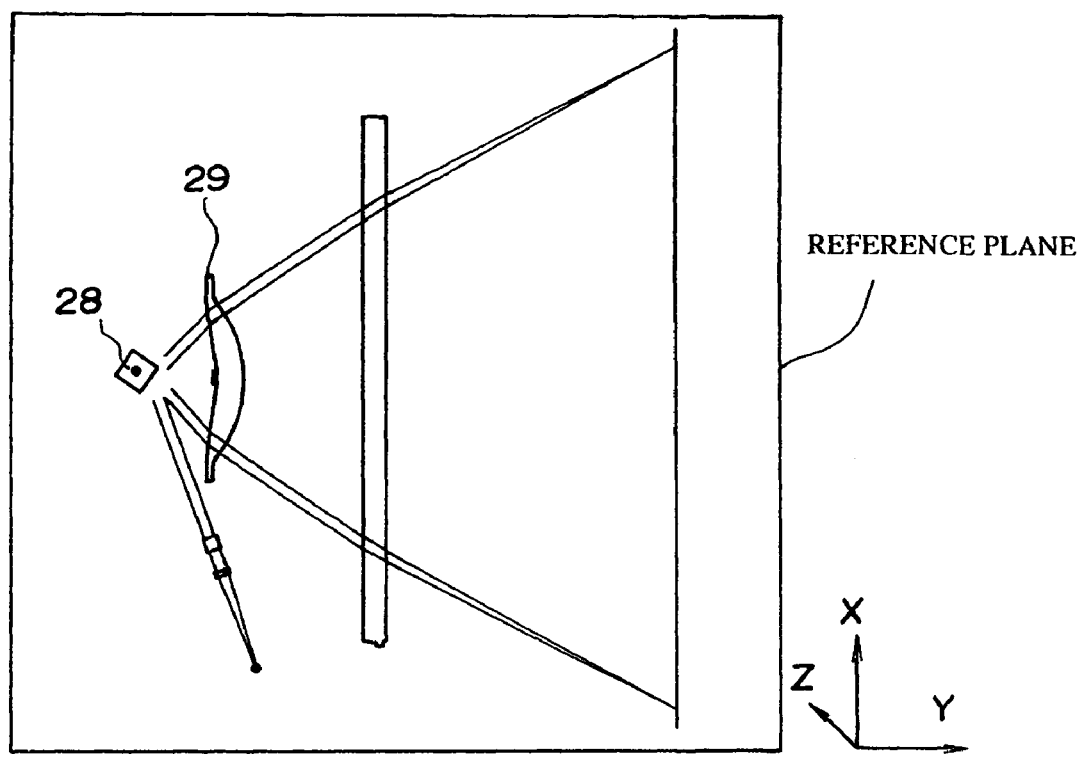
FIG. 8 is a plan view for explaining the scanning optical device according to the conventional technique.
Figure 9:
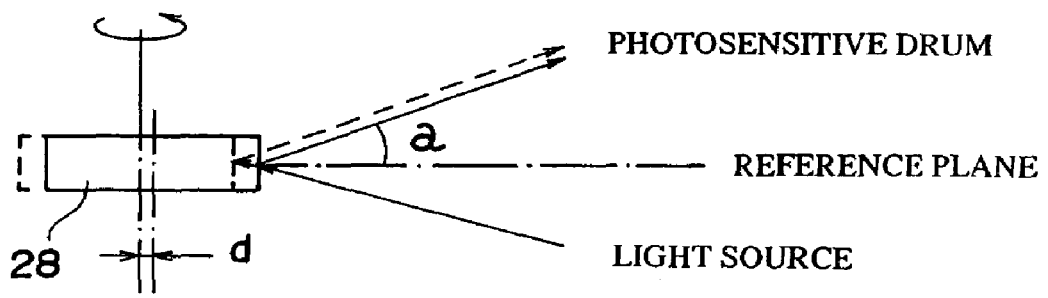
FIG. 9 is a diagram for explaining an optical axis obtained when plane eccentricity of a polygon mirror occurs with respect to a rotating shaft.

The scanning optical device C shown in FIG. 6, optical paths on which the same optical members are arranged are symmetrically arranged in FIG. 6. The optical paths are defined as a scanning group A and a scanning group B, respectively. In the embodiment, colors of the same series are exposed by the same scanning group, and, in an optical arrangement in each group, a laser beam which exposes a photosensitive drum which develops a color having a low brightness uses an optical path having a small optical incident angle.

As in the embodiment, colors of the same series are arranged in the same scanning group because the write positions in the main scanning direction are uniformed as described in the second embodiment. As a result, an image forming operation can be established with a small amount of color shift between colors of the same series.

In the scanning optical device which performs deflection and scanning in opposite directions as in the embodiment, a color shift in the main scanning direction between scanning groups is easily deteriorated in comparison with that in each scanning group due to a write position or an influence of magnification on each optical path. For this reason, a color shift between colors of the same series is deteriorated, the line widths of the colors seem to be increased. As a result, roughness disadvantageously increases. Therefore, when colors of images formed by the photosensitive drums arranged in FIG. 6 are six colors, i.e., yellow, magenta, cyan, black, light magenta, and light cyan, color orders in the embodiment are two orders described below.

Arrangement 1
Scanning group B→9*a*: Yellow, 9*b*, Light cyan, 9*c*: Cyan
Scanning group A→9*d*: Black, 9*e*: Magenta, 9*f*: Light magenta Arrangement 2
Scanning group B→9*a*: Yellow, 9*b*, Light magenta, 9*c*: Magenta
Scanning group A→9*d*: Black, 9*e*: Cyan, 9*f*: Light cyan As described above, colors of the same series are scanned by the same scanning group to make it possible to uniform write positions in a main scanning direction of the colors of the same series, and an image forming operation is stabilized with a small amount of color shift between colors of the same series. An image level in amount of optical facet angle error of a rotating shaft of a polygon mirror can be improved as in the first and second embodiment, and image performance can be kept preferable without unnecessarily improving the precessions of respective parts.

[Fourth Embodiment]

A device according to a fourth embodiment will be described below with reference to FIG. 6. Since the basic configuration of the device according to the embodiment is the same as that of the embodiment described above, a repetitive explanation is not described. A configuration which is a characteristic feature of the embodiment will be described below.

A scanning optical device C used in the embodiment employs the following system. That is, as in the third embodiment described above, three laser beams are incident on both sides of one polygon mirror 10, and six photosensitive drums 9a to 9f are exposed. An arrangement of optical parts is the same as that in the third embodiment. In the embodiment, laser beams which expose photosensitive drums which develop a plurality of colors of the same series are divided into a color group having a high brightness and a color group having a low brightness, and the photosensitive drums are exposed by different scanning groups, respectively. In an optical arrangement in each group, a laser beam which exposes a photosensitive drum which develops a color having a low brightness uses an optical path having a small oblique incident angle.

As in the embodiment, colors of the same series are deflection-scanned by different scanning groups, respectively, because colors having lower brightness are used in the same series as colors mainly used such as halftone colors, solid colors, or the like, and colors having higher brightness are often subsidiarily used. For this reason, the mainly used colors having lower brightness are scanned simultaneously as much as possible. Furthermore, since colors having lower brightness are easily conspicuous on an image, the colors are set on an optical path having a small oblique incident angle to make it possible to improve image quality.

For this reason, when colors of an image formed on the photosensitive drums arranged in FIG. 6 are six colors, i.e., yellow, magenta, cyan, black, light magenta, and light cyan, color orders in the embodiment are two orders described below.

Arrangement 1

Scanning group B→9a: Yellow, 9b, magenta, 9c: Cyan
Scanning group A→9d: Black, 9e: Light cyan, 9f: Light magenta Arrangement 2

Scanning group B→9a: Yellow, 9b, Magenta, 9c: Black
Scanning group A→9d: Cyan, 9e: Light cyan, 9f: Light magenta With the above configuration, an image level can be increased even though a halftone color, a solid color, or the like is recorded. Furthermore, as in the embodiments described above, an image level can be increased in an amount of optical facet angle error of a rotating shaft of the polygon mirror, and image performance can be kept preferable without unnecessarily improving the precessions of respective parts.

[Another Embodiment]

In the embodiments described above, when six photosensitive drums are arranged. In addition to yellow, magenta, cyan, and black, light cyan and light magenta are exemplified. However, when four or more photosensitive drums are arranged, as colors except for yellow, magenta, cyan, and black, light cyan and light magenta are not necessary used. For example, other colors, i.e., a transparent toner, a white toner, and the like may be used. In this case, the transparent toner and the white toner have no brightness or brightness higher than that of yellow. For this reason, the two colors may be arranged on an optical path having a large oblique incident angle, and an order of the two colors is not specified to a fixed order.

In the embodiments described above, the drawings in which a beam is deflection-scanned such that optical paths are arranged above a reference plane. However, since an oblique incident angle is defined by an angle between the optical path and the reference plane, the optical paths may be arranged such that the beam is downwardly deflection-scanned. In this case, a color having a low brightness may be arranged on an optical path having the smallest angle.

In the embodiments described above, even though an order of light cyan and light magenta having almost equal brightness and an order of cyan and magenta having almost equal brightness are changed, an influence on performance is small, and a sufficiently preferable image can be obtained.

In the third and fourth embodiments, a plurality of independent scanning optical devices may be arranged without using the scanning groups A and B, and optical scanning may be performed by the scanning optical devices like the scanning groups A and B in the third and fourth embodiments.

Furthermore, the optical parts arrangement in the scanning optical devices described in the embodiments described above are only examples. However, other arrangements which can obtain the same effect as described above may also be used. The embodiments of the present invention has been described. However, the present invention is not limited to the embodiment, and any modification is effective within the spirit and scope of the invention.

This application claims the benefit of priority from the prior Japanese Patent Application No. 2005-254725 filed on Sep. 2, 2005 the entire contents of which are incorporated by reference herein.

What is claimed is:

1. An image forming apparatus comprising:
    a plurality of image bearing members,
    a plurality of light sources each emitting a laser beam to form an electrostatic latent image on respective ones of image bearing members,
    a plurality of rotating polygon mirrors, each of which reflects plural ones of the laser beams for scanning, the laser beams being entered to the rotating polygon mirrors with different angles to a plane perpendicular to a rotating axis of the rotating polygon mirror; and
    a plurality of developing devices which respectively develop the latent images formed on the image bearing members with a plurality of differently colored toners respectively, the color toners including at least two color toners which have a same hue and a different brightness each other,
    wherein the laser beams corresponding to the color toners having the same hue are scanned with common rotating polygon mirror,
    wherein, in at least one rotating polygon mirror in the plurality of rotating polygon mirrors, the brightness of toner developing the electrostatic latent image formed with a laser beam entering to the rotating polygon mirror with a first angle to the plane is higher than the brightness of toner developing the electrostatic latent image formed with a laser beam entering to the rotating polygon mirror with a second angle to the plane, and wherein the second angle is smaller than the first angle.

2. The image forming apparatus according to claim 1,
wherein the plurality of developing devices include developing devices which develop electrostatic latent images on the image bearing members with cyan toner and light cyan toner having the same hue as the cyan toner and a higher brightness from the brightness of the cyan toner respectively, and wherein the laser beams corresponding to the cyan toner and the light cyan toner are scanned with the common polygon mirror.

3. The image forming apparatus according to claim 2,
wherein the plurality of developing devices include developing devices which develop electrostatic latent image on the image bearing member with yellow toner,
wherein the laser beams corresponding to the cyan toner, the light cyan toner, and yellow toner are scanned with the common polygon mirror,
wherein an angle formed with the laser beam from the light sources corresponding to the yellow toner and the plane is larger than an angle formed with the laser from the light the sources corresponding to the light cyan toner and the plane.

4. The image forming apparatus according to claim 1,
wherein the plurality of developing devices include developing devices which develop electrostatic latent images on the image bearing members with magenta toner and light magenta toner having the same hue as the magenta toner and a higher brightness from the brightness of the magenta toner respectively, and wherein the laser beams corresponding to the magenta toner and the light magenta toner are scanned with the common polygon mirror.

5. The image forming apparatus according to claim 4,
wherein the plurality of developing devices include developing devices which develop electrostatic latent image on the image bearing member with yellow toner,
wherein the laser beams corresponding to the magenta toner, the light magenta toner, and yellow toner are scanned with the common polygon mirror,
wherein an angle formed with the laser beam from the light sources corresponding to the yellow toner and the plane is larger than an angle formed with the laser from the light the sources corresponding to the light magenta toner and the plane.

6. A scanning optical apparatus comprising:
a plurality of light sources each emitting a laser beam corresponding to a respective one of plural color toners respectively to form electrostatic latent images on a plurality of image bearing members, the plurality of light sources including at least two light sources corresponding to color toners having a same hue and a different brightness,
a plurality of rotating polygon mirrors, each of which reflects plural ones of the laser beams for scanning from the laser beam sources, the laser beams being entered to the polygon mirrors with different angles to a plane perpendicular to a rotating axis of the rotating polygon mirror; and
wherein the laser beams corresponding to the color toners having the same hue are scanned with the common rotating polygon mirror,
wherein, in at least one rotating polygon mirror in the plurality of rotating polygon mirrors, an angle formed between the plane and the laser beam corresponding to a first color toner is larger than an angle formed between the plane and the laser beam corresponding to a second color toner which has a lowest brightness than the first color toner.

7. A scanning optical apparatus according to claim 6,
wherein the plurality of light sources include hue light sources corresponding to cyan toner and light cyan toner having the same as the cyan toner and a higher brightness from the brightness of the cyan toner, and wherein the laser beams emitted from the light sources corresponding to the cyan toner and the light cyan toner are scanned with the common polygon mirror.

8. A scanning optical apparatus according to claim 7,
wherein the plurality of light sources include light source corresponding to yellow toner,
wherein the laser beams emitted from the light sources corresponding to the cyan toner, the light cyan toner, and yellow toner are scanned with the common polygon mirror,
wherein an angle formed with the laser beam emitted from the light source corresponding to yellow and the plane is larger than an angle formed with the laser emitted from the light sources corresponding to light cyan and the plane.

9. A scanning optical apparatus according to claim 6,
wherein the plurality of light sources include light sources corresponding to magenta toner and light magenta toner having the same hue as the magenta toner and a higher brightness from the brightness of the magenta toner, and wherein the laser beams corresponding to the magenta toner and the light magenta toner are scanned with the common polygon mirror.

10. A scanning optical apparatus according to claim 9,
wherein the plurality of light sources include a light source corresponding to yellow toner,
wherein the laser beams emitted from the light sources corresponding to the magenta toner, the light magenta toner, and yellow toner are scanned with the common polygon mirror,
wherein an angle formed with the laser beam emitted from the light source corresponding to yellow and the plane is larger than an angle formed with the laser emitted from the light sources corresponding to light magenta and the plane.

* * * * *